US012805446B2

(12) United States Patent
Zollondz et al.

(10) Patent No.: US 12,805,446 B2
(45) Date of Patent: Nov. 24, 2026

(54) CLOSING FLAP FOR A THRESHING OR SEPARATING DEVICE

(71) Applicant: Deere & Company, Moline, IL (US)

(72) Inventors: Jonas Zollondz, Mandelbachtal (DE); Martin Rittershofer, Zweibrucken (DE)

(73) Assignee: Deere & Company, Moline, IL (US)

( * ) Notice: Subject to any disclaimer, the term of this patent is extended or adjusted under 35 U.S.C. 154(b) by 596 days.

(21) Appl. No.: 18/125,210

(22) Filed: Mar. 23, 2023

(65) Prior Publication Data

US 2023/0329151 A1 Oct. 19, 2023

(30) Foreign Application Priority Data

Apr. 13, 2022 (DE) ......................... 102022109160.0

(51) Int. Cl.
*A01F 12/18* (2006.01)

(52) U.S. Cl.
CPC .................................... *A01F 12/18* (2013.01)

(58) Field of Classification Search
CPC ........ A01F 12/18; A01F 12/181; A01F 12/26; A01F 12/28; A01F 12/44; A01D 41/00
USPC ......................... 460/110, 69, 66, 109, 81, 83
See application file for complete search history.

(56) References Cited

U.S. PATENT DOCUMENTS 107,355 A * 9/1870 Fuos ....................... A01F 12/20 460/71
870,731 A * 11/1907 Landis .................... A01F 12/24 460/110
962,192 A * 6/1910 Blixt ....................... A01F 12/28 460/109
2,821,198 A * 1/1958 Oberholtz .............. A01F 12/24 460/109
4,259,829 A 4/1981 Strubbe
(Continued)

FOREIGN PATENT DOCUMENTS

BR 102020018945 A2 3/2022
CN 101194559 6/2008
(Continued)

OTHER PUBLICATIONS https://youtu.be/bf8-EIVMoW8?list=PLpTnMYmC5HYd9iBvByjvIUTFDzmgKKpvv&t=63, MDW Harvest Master 527 STS, available as early as Jun. 9, 2019.

*Primary Examiner* — Christopher J Sebesta
*Assistant Examiner* — Sunny D Webb
(74) *Attorney, Agent, or Firm* — Taft Stettinius & Hollister LLP; Stephen F. Rost

(57) ABSTRACT

A closing flap for a threshing or separating cage of a threshing and/or separating device. The threshing or separating cage can be provided with threshing or separating elements which are configured, in cooperation with a threshing cylinder or a separating rotor of the threshing and separating device, to thresh out or separate crop, and the threshed or separated grain can pass through passages provided in and/or between the threshing or separating elements and reach a cleaning system. The closing flap can be movable between a closed position, in which it at least partially closes a cavity arranged downstream of one or more of the passages, and an open position. On the side of the closing flap facing the cavity can be provided with structure for extracting crop which has collected in the cavity.

15 Claims, 7 Drawing Sheets

(56) References Cited

U.S. PATENT DOCUMENTS

| | | | | |
|---|---|---|---|---|
| 4,502,493 | A * | 3/1985 | Jones | A01F 12/448 209/394 |
| 4,875,891 | A * | 10/1989 | Turner | A01F 12/442 460/108 |
| 4,968,284 | A | 11/1990 | Klimmer et al. | |
| 5,085,616 | A | 2/1992 | Matousek et al. | |
| 5,338,257 | A | 8/1994 | Underwood | |
| 6,802,771 | B2 * | 10/2004 | Schwersmann | A01F 12/442 460/109 |
| 6,932,697 | B2 * | 8/2005 | Baumgarten | A01D 41/1276 460/1 |
| 7,153,204 | B2 * | 12/2006 | Esken | A01F 12/28 460/59 |
| 7,771,260 | B2 | 8/2010 | Ricketts et al. | |
| 7,909,171 | B2 * | 3/2011 | Mammen | A01F 12/34 209/396 |
| 8,118,649 | B1 | 2/2012 | Murray et al. | |
| 9,155,249 | B2 * | 10/2015 | Baumgarten | A01F 12/28 |
| 9,345,197 | B2 | 5/2016 | Biggerstaff et al. | |
| 9,445,546 | B2 | 9/2016 | May | |
| 10,104,840 | B2 | 10/2018 | Duquesne et al. | |
| 10,869,427 | B2 | 12/2020 | Robertson | |
| 10,905,050 | B2 | 2/2021 | Robertson | |
| 12,490,679 | B2 * | 12/2025 | Meschke | A01F 7/06 |
| 2003/0032465 | A1 | 2/2003 | Schwersmann et al. | |
| 2008/0194306 | A1 | 8/2008 | Ricketts et al. | |
| 2014/0335923 | A1 | 11/2014 | Biggerstaff et al. | |
| 2015/0156971 | A1 | 6/2015 | May | |
| 2017/0196169 | A1 | 7/2017 | Duquesne et al. | |
| 2017/0325406 | A1 | 11/2017 | Kemmerer et al. | |
| 2021/0015048 | A1 | 1/2021 | Kile | |
| 2021/0084818 | A1 * | 3/2021 | Poelling | A01D 41/1272 |
| 2021/0311485 | A1 | 10/2021 | Borgstadt | |

FOREIGN PATENT DOCUMENTS

| | | | | |
|---|---|---|---|---|
| CN | 112391177 | A | 2/2021 | |
| DE | 50208752 | | 1/2007 | |
| DE | 502004008006 | | 10/2008 | |
| DE | 102010061863 | A1 * | 5/2012 | A01F 12/24 |
| DE | 102011051215 | A1 | 12/2012 | |
| DE | 102011088543 | | 6/2013 | |
| EP | 0516891 | | 12/1992 | |
| EP | 1284098 | A1 | 2/2003 | |
| EP | 1449425 | B1 | 9/2008 | |
| EP | 2327290 | | 6/2011 | |
| EP | 2327290 | A2 * | 6/2011 | A01F 12/24 |
| EP | 2537404 | A1 | 12/2012 | |
| EP | 2594126 | A1 * | 5/2013 | A01F 12/26 |
| EP | 2537404 | B1 | 6/2016 | |
| EP | 3075226 | A1 * | 10/2016 | A01F 12/28 |
| EP | 2594126 | B1 * | 7/2017 | A01F 12/181 |
| FR | 2621216 | A1 * | 4/1989 | A01F 12/24 |
| WO | WO-2018133902 | A1 * | 7/2018 | A01F 12/446 |
| WO | WO-2018185035 | A1 * | 10/2018 | A01F 12/28 |
| WO | WO-2021222229 | A1 * | 11/2021 | A01F 12/28 |

* cited by examiner

CLOSING FLAP FOR A THRESHING OR SEPARATING DEVICE

RELATED APPLICATIONS

This application claims priority to international application DE 10 2022 109 160.0, filed Apr. 13, 2022, which is hereby incorporated by reference in its entirety.

FIELD OF THE DISCLOSURE

The present disclosure relates generally to threshing and separating devices of combine harvesters.

BACKGROUND

Combine harvesters are used for harvesting cereals from which grain is separated by means of a threshing device. The grain is separated further in a separating device. The threshed and separated grain is cleaned, deposited in a grain tank and transferred to a transport vehicle. Tangential or axial threshers are used as a threshing device, while usually tangential and axial separating devices or straw walkers are used as a separating device. The axial threshers and axial separating devices may be produced as a one-piece component.

The tangential and axial threshers and separating devices comprise a threshing cylinder or a rotor, and cooperating therewith a threshing or separating cage provided with threshing or separating elements which, in cooperation with the threshing cylinder or separating rotor, thresh out or separate the crop. The threshed or separated grain can pass through passages provided in and/or between the elements, and enter the cleaning system. These passages may be formed between said threshing or separating elements, which may be configured as finger bars, wires or strips or similar structures.

Under certain operating conditions, it may be appropriate to partially or fully close the path of the crop between all or some passages and the cleaning system, so that the crop undergoes a greater threshing or separating effect; this prevents a large part of the crop passing through the passages directly at the inlet of the threshing or separating device or on its downhill side and reaching the cleaning system together with the contaminants and unthreshed grain ears contained therein. For optional closing of the passages, closing flaps are used which are pivotally movable about an axis between an open position and a closed position (see EP 1 284 098 A1 and EP 2 537 404 A1). Usually, the closing flaps are smooth on their insides facing the threshing cylinder or rotor.

For structural reasons, a certain distance remains between the closing flap and the passage. A cavity is formed in-between, in which crop can collect and seize when the closing flap is closed. Under certain operating conditions, the crop thus remains in this cavity, and crop is prevented from leaving the cavity even when the flap is opened. The desired effect of the threshing or separating device is then no longer achieved.

SUMMARY

The disclosure provides a closing flap for a threshing or separating cage of a threshing and/or separating device. The threshing or separating cage is provided with threshing or separating elements which are configured, in cooperation with a threshing cylinder or a separating rotor of the threshing and separating device, to thresh out or separate crop. The threshed or separated grain can pass through passages provided in and/or between the elements, and enter a cleaning system. The closing flap can be movable between a closed position in which it at least partially closes a cavity arranged downstream of one or more of the passages, and an open position.

On its side facing the cavity, the closing flap may be provided with means for extracting crop which has collected in the cavity. In this way, on opening of the closing flap, any crop which has collected in the cavity is at least partially also extracted. The cavity can thus be evacuated and the grain can flow through the passage and the cavity to the cleaning system.

The closing flap may include a body which is pivotally movable between the open and closed positions. The pivot axis in particular can lie on the side lying upstream of the threshing or separating cylinder relative to the rotational direction.

The means for extracting crop which has collected in the cavity may be formed by one or more ribs extending from the body in the direction of the inner circumference of the threshing or separating cage and in the circumferential direction of the threshing or separating cage, or rods with transverse branches extending from the body. Several ribs or rods can be arranged spaced apart from one another in the axial direction of the threshing cylinder or separating rotor.

The rib or ribs may (each) comprise a leading edge, relative to the rotational direction of the threshing cylinder or separating rotor, which, from a leading end adjacent to the pivot axis in the rotational direction of the threshing cylinder or threshing rotor, gradually draws nearer to the inner circumference of the threshing or separating cage.

A trailing edge of the rib may extend from an end point of the leading edge in the direction towards the body of the closing flap. The trailing edge of the rib can enclose a trailing angle with a radius of the threshing or separating cage. The rib can accordingly be formed like a shark fin, and on its rear side can have has an undercut region in which the crop can collect. Movement of the closing flap and hence the rib into the open position can forcibly clear said region and moves the crop therein out of the cavity, so that the crop present in the remainder of the cavity can be also carried along and discharged.

In one implementation, there is provided a closer for a separating cage of a separating device, wherein the separating cage is provided with separating elements which are configured, in cooperation with a separating rotor of the separating device, to separate grain, and the separated grain can pass through passages provided between separating elements and reach a cleaning system, a cavity being defined downstream of said passages. The closer includes a closing flap movable between a closed position, in which the closing flap at least partially closes the cavity, and an open position, said closing flap having a side facing the cavity, the closing flap includes structure positioned to extract crop which has collected in the cavity as the closing flap moves from the closed to open position.

In some implementations, the closer includes wherein the closing flap comprises a body which is pivotally movable between the open and closed positions.

In some implementations, the closer includes wherein said structure further comprises at least one rib extending from the body in the direction of the inner circumference of the separating cage and in the circumferential direction of the separating cage.

In some implementations, the closer further includes transverse branches extending from the ribs.

In some implementations, the closer includes wherein the at least one rib comprises a leading edge relative to the rotational direction of the separating rotor, which, from a leading end adjacent to the pivot axis in the rotational direction of the separator rotor, gradually draws nearer to the inner circumference of the threshing or separating cage.

In some implementations, the closer includes wherein the rib further comprises a trailing edge extending from an end point of the leading edge in the direction towards the body of the closing flap.

In some implementations, the closer includes wherein the trailing edge of the rib encloses a trailing angle with the radius of the separating cage.

In another implementation, there is provided a separating device including a separating rotor and a separating cage provided with separating elements which are configured, in cooperation with the separating rotor, to separate grain, and the separated grain can pass through passages provided between the separating elements and reach a cleaning system. A closing flap is movable between a closed position, in which the closing flap at least partially closes a cavity arranged downstream of one or more of the passages, and an open position, said closing flap further comprises structure positioned to extract crop which has collected in the cavity as the closing flap moves from the closed to open position.

In some implementations, the separating device includes wherein the closing flap comprises a body which is pivotally movable between the open and closed positions, and wherein said structure further comprises at least one rib extending from the body in the direction of the inner circumference of the separating cage and in the circumferential direction of the separating cage.

In some implementations, the separating device further includes transverse branches extending from the ribs.

In some implementations, the separating device includes wherein the at least one rib comprises a leading edge relative to the rotational direction of the separating rotor, which, from a leading end adjacent to the pivot axis in the rotational direction of the separator rotor, gradually draws nearer to the inner circumference of the separating cage.

In some implementations, the separating device includes wherein the rib further comprises a trailing edge extending from an end point of the leading edge in the direction towards the body of the closing flap.

In some implementations, the separating device includes wherein the trailing edge of the rib encloses a trailing angle with the radius of the separating cage.

In a further implementation, there is provided a closer for a threshing cage of a threshing device, wherein the threshing cage is provided with threshing elements which are configured, in cooperation with a threshing rotor of the threshing device, to thresh grain, and the threshed grain can pass through passages provided between separating elements and reach a cleaning system, a cavity being defined downstream of said passages. The closer includes a closing flap movable between a closed position, in which the closing flap at least partially closes the cavity, and an open position. Said closing flap includes a side facing the cavity, wherein the closing flap includes structure positioned to extract crop which has collected in the cavity as the closing flap moves from the closed to open position.

In some implementations, the closer includes wherein the closing flap comprises a body which is pivotally movable between the open and closed positions.

In some implementations, the closer includes wherein said structure further comprises at least one rib extending from the body in the direction of the inner circumference of the threshing cage and in the circumferential direction of the threshing cage.

In some implementations, the closer further includes transverse branches extending from the ribs.

In some implementations, the closer includes wherein the at least one rib comprises a leading edge relative to the rotational direction of the threshing rotor, which, from a leading end adjacent to the pivot axis in the rotational direction of the threshing rotor, gradually draws nearer to the inner circumference of the threshing or separating cage.

In some implementations, the closer includes wherein the rib further comprises a trailing edge extending from an end point of the leading edge in the direction towards the body of the closing flap.

In some implementations, the closer includes wherein the trailing edge of the rib encloses a trailing angle with the radius of the threshing cage.

Other features and aspects will become apparent by consideration of the detailed description and accompanying drawings.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein.

DETAILED DESCRIPTION

Figure 1:
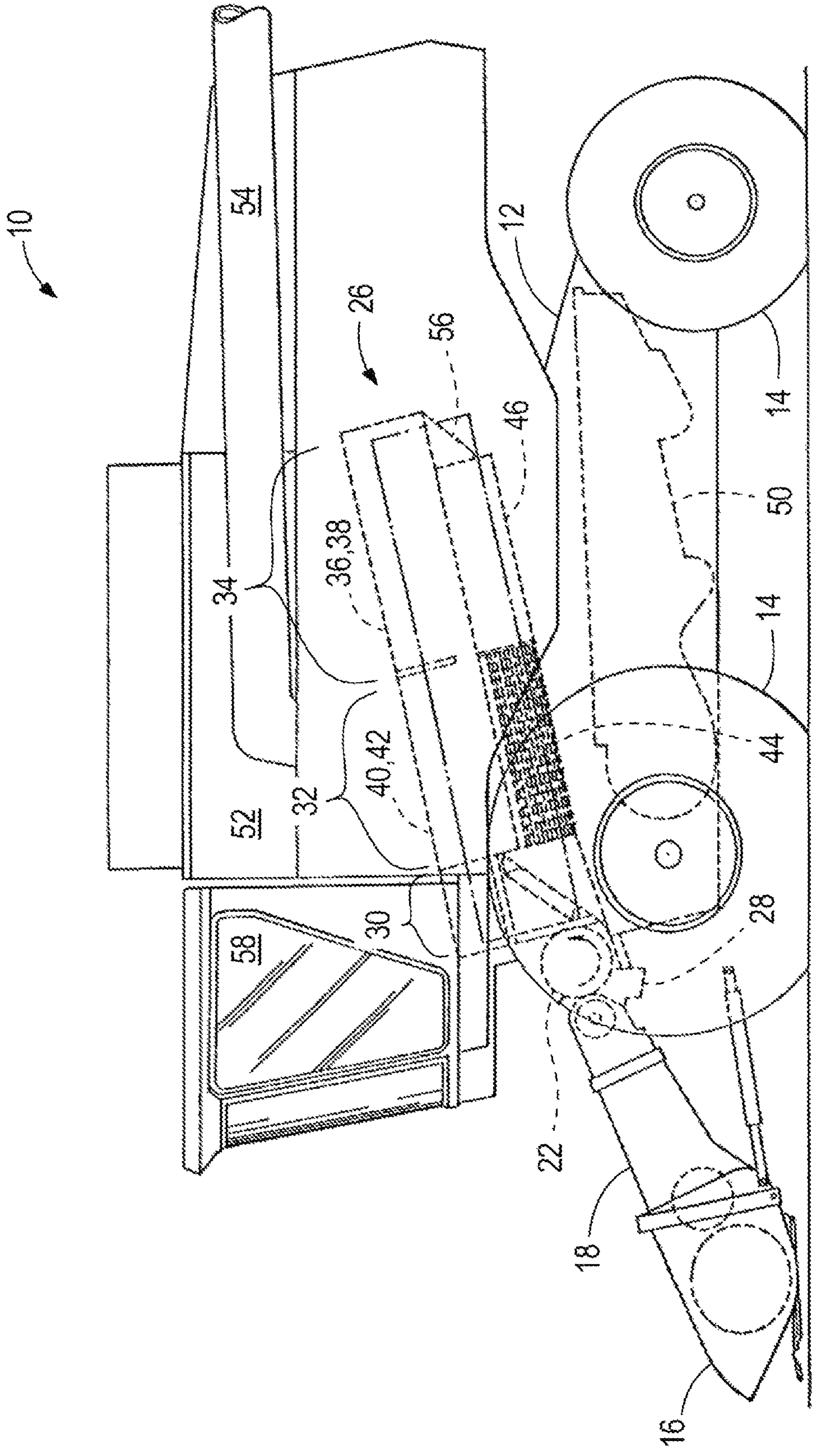
FIG. 1 shows a schematic, partially cut away side view of a combine harvester.
Figure 2:
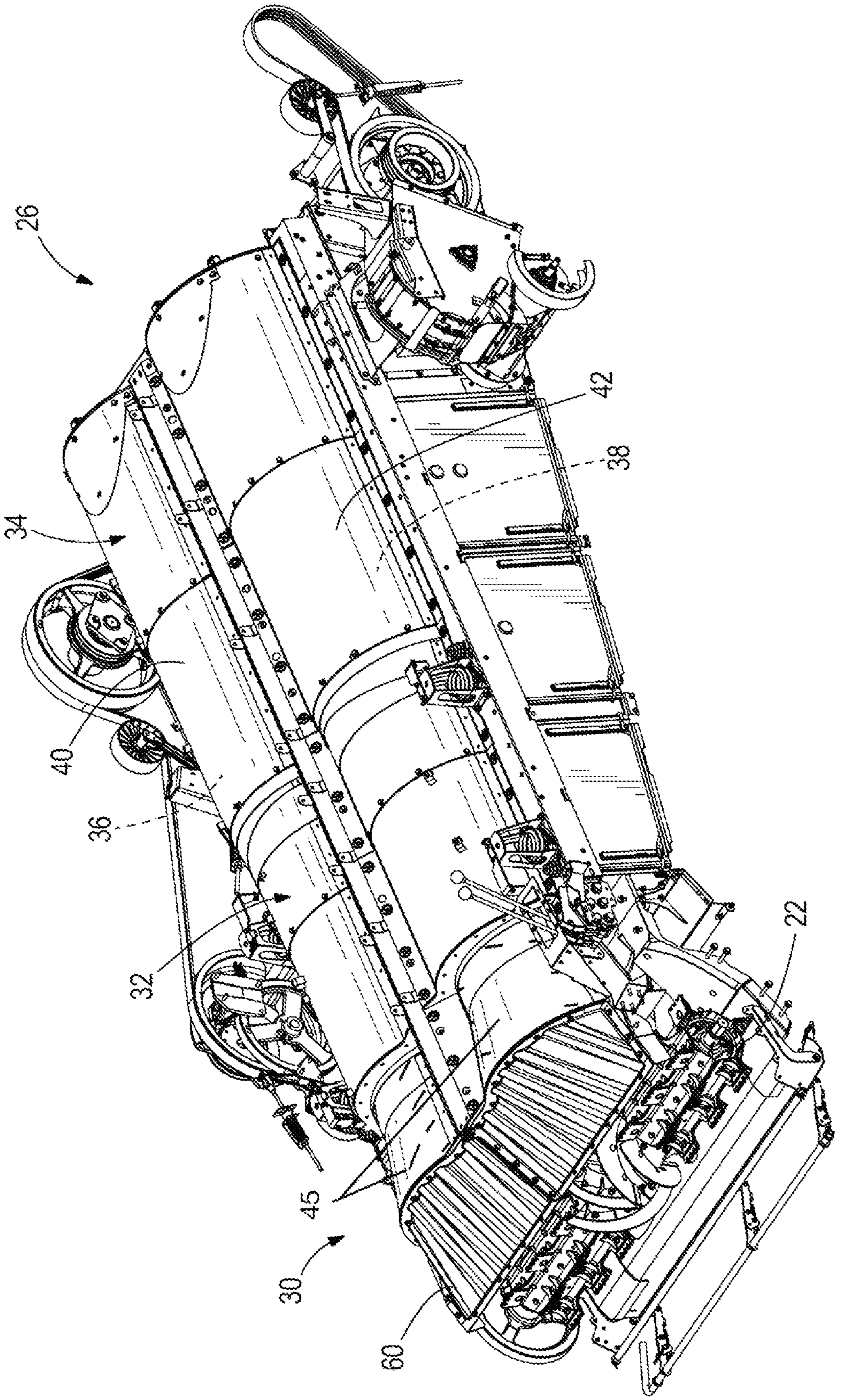
FIG. 2 shows a perspective view of the axial threshing and separating device of the combine harvester from FIG. 1.

FIG. 1 shows an agricultural machine which is configured as a combine harvester 10 which comprises a supporting structure 12, and having ground engaging driven front and steerable rear wheels 14. A crop cutter 16 can be provided for harvesting the crop and conducting it to a sloping conveyor 18. The sloping conveyor 18 may conduct the crop to a separating module (FIG. 2). The separating module may contain a feed accelerator 22 and an axial threshing and separating device 26. A stone catching trough 28 may be positioned between the sloping conveyor 18 and the feed accelerator 22.

Figure 3:
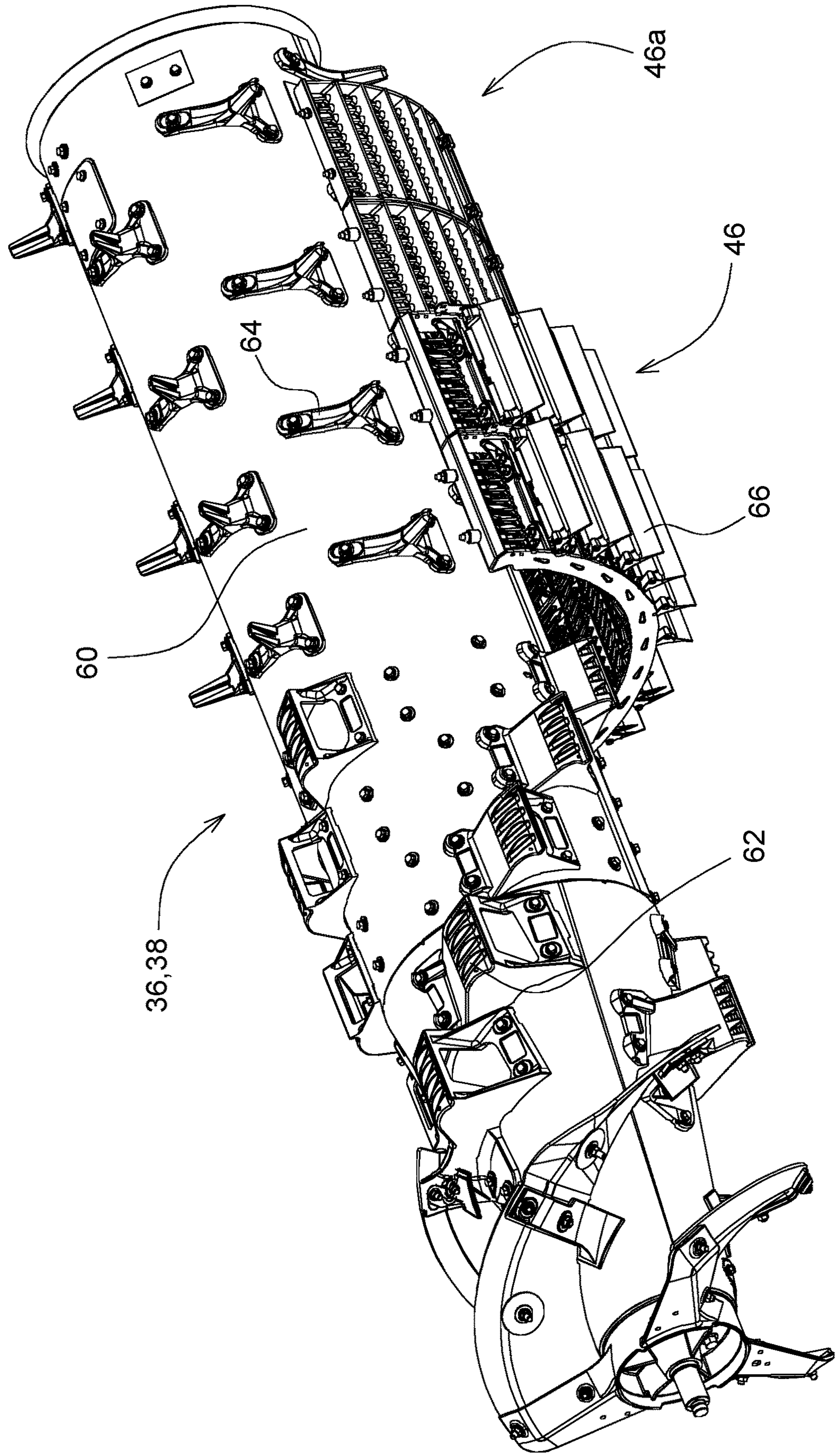
FIG. 3 shows a perspective view of the threshing and separating rotor of the axial threshing and separating device from FIG. 2, and the associated separating cage.

With reference to FIGS. 1 and 2, the axial threshing and separating device 26 may thresh and separate the harvested crop material. In the implementation illustrated, the axial threshing and separating device 26 may comprise an inlet portion 30, a threshing portion 32 and a separating portion 34. Furthermore, the illustrated axial threshing and separating device 26 may comprise a first rotor 36 and a second rotor 38 which are radially surrounded by a first and second housing 40, 42 respectively. As shown, the housings 40, 42 may extend along the length of the processing unit 26. Accordingly, in the implementation illustrated, the housings 40, 42 may comprise a transfer portion 45 which may form part of the inlet portion 30. The respective rotors 36, 38, may extend between the inlet portion 30 and the separating portion 34. The rotors 36, 38, as seen in FIG. 3, can each comprise a hollow cylindrical cylinder 60 with several crop processing elements 62 in the threshing region and 64 in the separating region (FIG. 3) which can engage with the crop and turn it in the respective housing 40, 42. The lower side of each housing 40, 42 can have a threshing cage 44 below the threshing portion 32, and a front separating cage 46 and a rear separating cage 46*a* below the separating portion 34. Although the axial threshing and separating device 26 is shown with a first and a second rotor 36, 38, other configurations are possible, including another or additional implementations comprising only a single rotor and a single housing, and therefore a single threshing cage 44 and only one, either front or rear, separating cage 46, 46*a*.

Grain and chaff can fall through the threshing cage 44 and the separating cage 46, 46*a* and can be conducted to the cleaning system 50. The cleaning system 50 can remove the chaff and conducts the clean grain to a clean grain elevator (not shown). The clean grain elevator can deposit the clean grain in a grain tank 52. The clean grain in the tank 52 can be discharged onto a grain truck or lorry via a discharge screw 54.

Threshed and separated straw can be expelled from the axial threshing and separating device 26 through the outlet 56, and supplied to an ejection cylinder (not shown). The ejection cylinder in turn may eject the straw to the rear of the combine harvester 10. The operation of the combine harvester 10 may be controlled from the operator's cab 58.

Figure 4:
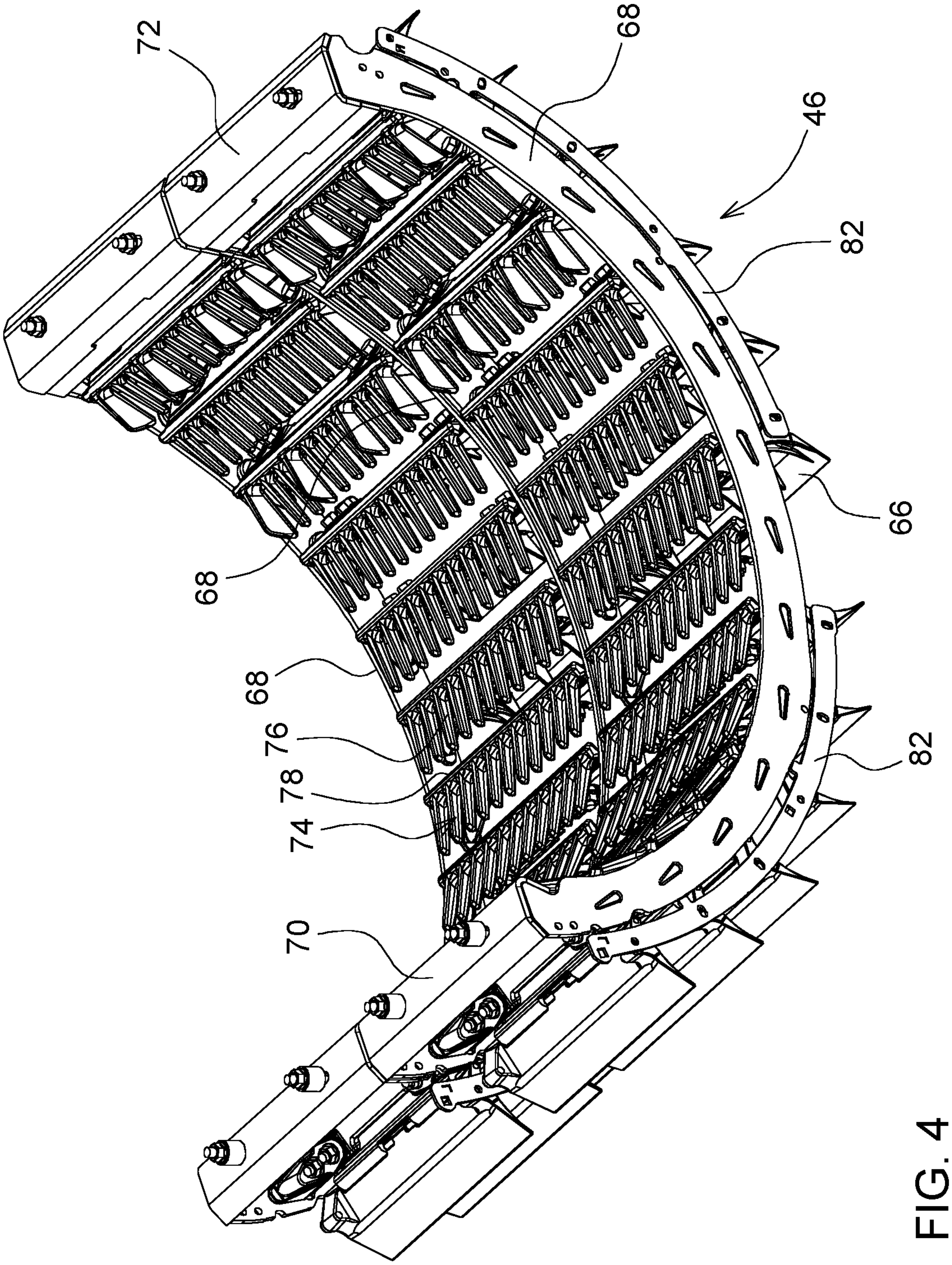
FIG. 4 shows a perspective view of the separating cage.
Figure 5:
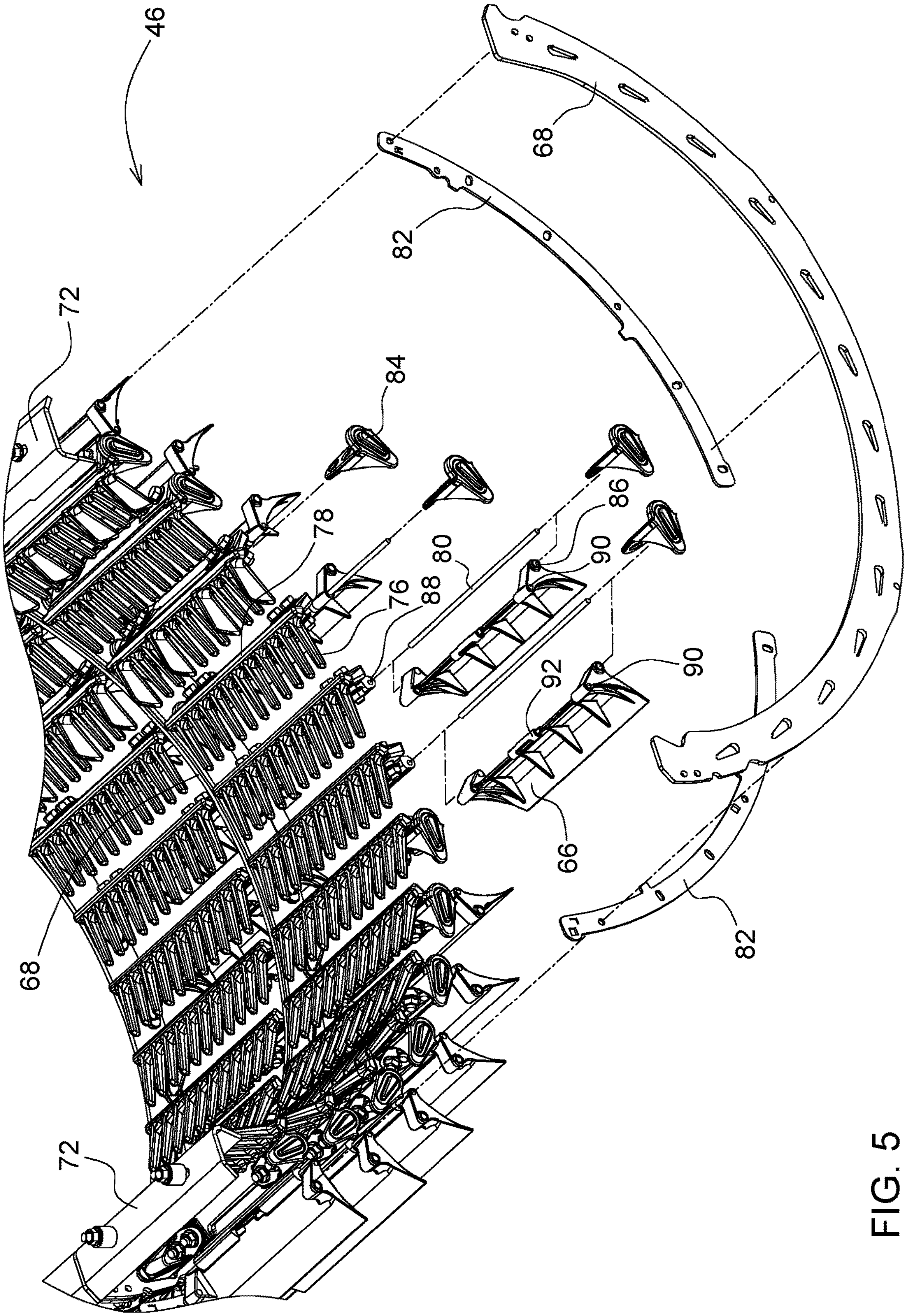
FIG. 5 shows an exploded view of the separating cage.

As shown in FIGS. 3 to 5, the front separating cage 46 may be fitted with adjustable closing flaps 66, while the rear separating cage 46 has no such closing flaps 66. The front separating cage 46 may comprise a frame with side and middle cheeks 68, which extend in the circumferential direction around the rotor 36 or 38 and may be connected together by end plates running axially to the rotor 36, 38. Finger bars 74 with fingers 76 may be arranged next to one another on a longitudinal strip 78 and extend between adjacent cheeks 68. A number of (in the implementation shown, twelve) finger bars 74 may be arranged behind one another in the circumferential direction of the rotor 36, 38. The rotational direction of the rotor 36, 38 is shown as clockwise in FIG. 4.

Figure 7:
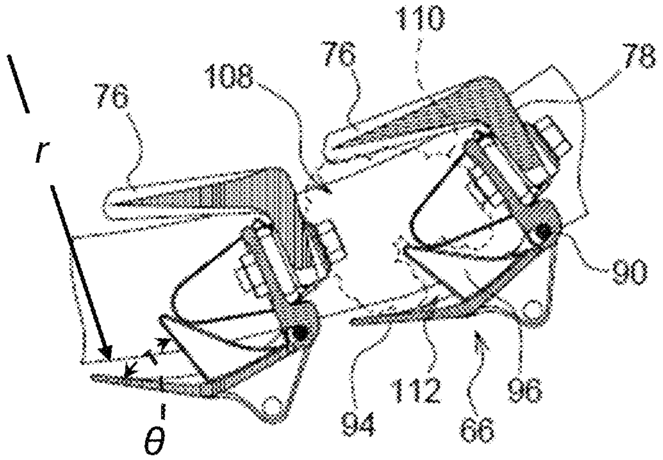
FIGS. 7 and 8 show schematically the operating method of a closing flap.
Figure 8:
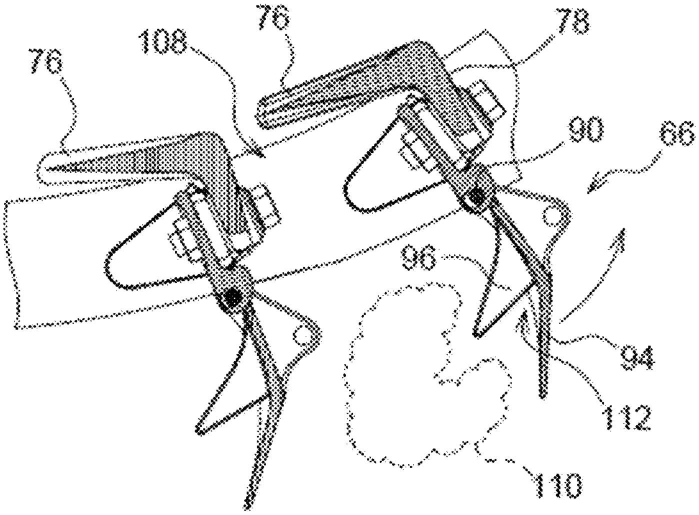

Referring now made to FIG. 5, the closing flaps 66 may be hinged at their leading ends in the rotational direction of the rotors 36, 38, so as to be pivotally movable about axes extending parallel to the rotational axis of the rotors 36, 38. For this, the closing flaps 66 may have bearing eyes 90, 92 which can be coupled by rods 80 to corresponding recesses 88 in the longitudinal strips 78 of the finger bars 74. Further openings 86 may be coupled to coupling elements 84, which can in turn be brought into connection with adjustment rods 82. Thus, the closing flaps 66 may be pivoted between a closed position, as shown in FIG. 7, and an open position, as shown in FIG. 8 by adjustment of the adjustment rods 82 in the circumferential direction of the cheeks 68 and rotor 36, 38. All closing flaps 66 on the left side of the separating cage 46, and also all closing flaps 66 on the right side of the separating cage 46, may be adjusted together in each case. The front closing flaps 66 in the forward direction of the combine harvester 10 can be adjusted together with or separately from the rear closing flaps 66. This adjustment may be made manually or by remote control from the cab by means of a respective actuator (not shown), or the actuators can be adjusted depending on the quantity of crop material passing through the separating cage 76, or depending on the slope angle, in order to achieve the desired separating effect. Here, reference is made to the disclosure of EP 1 284 098 A1 and EP 2 537 404 A1, which is included herein by reference.

Figure 6:
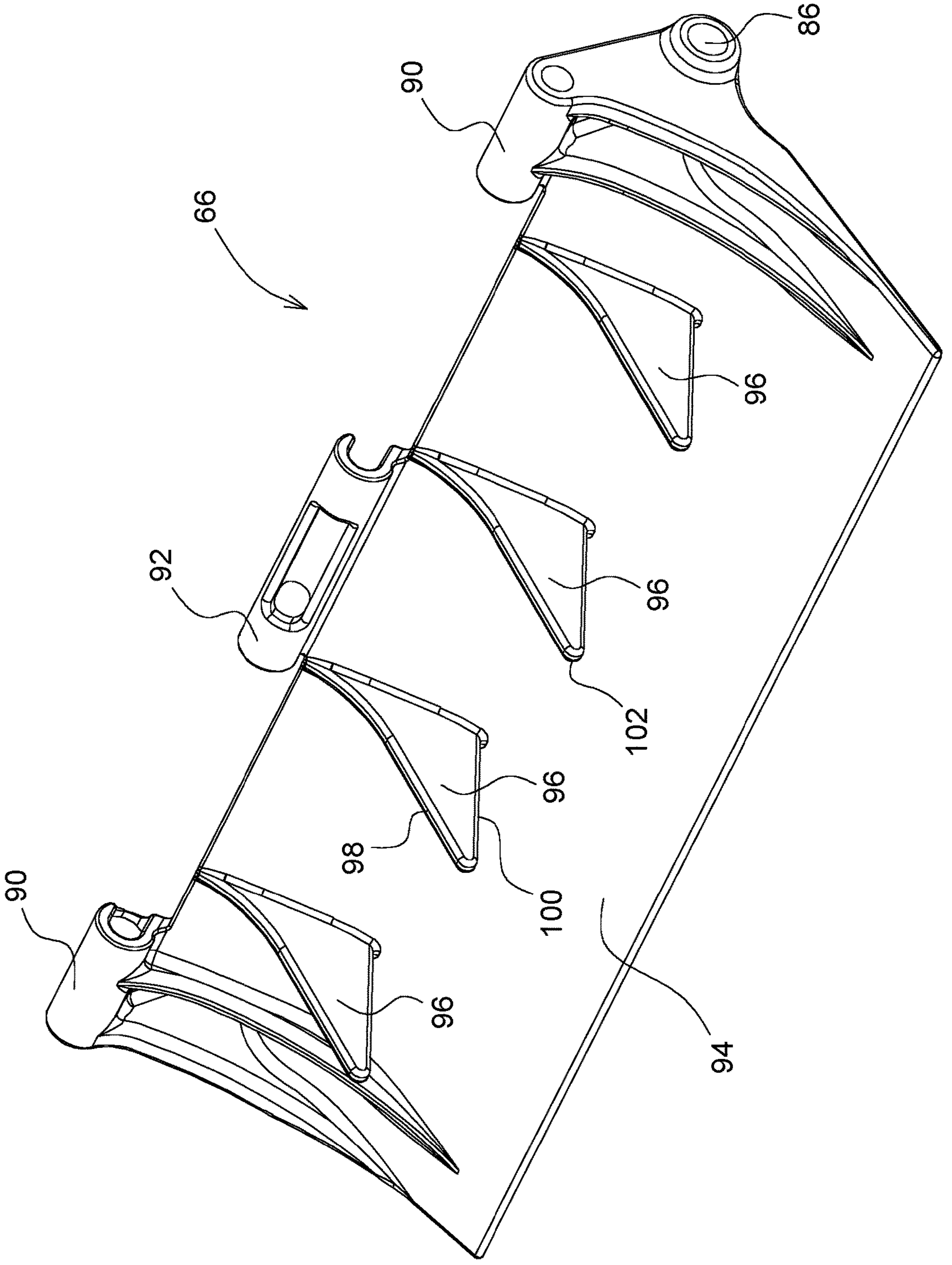
FIG. 6 shows a perspective view of a closing flap of the separating cage.

Referring now to FIG. 6, the closing flaps 66 may include a body 94 which serves to close the passage of the crop through the separating cage 46, and on which the bearing eyes 90, 92 and openings 94 may be formed. The closing flaps 66 may be made of plastic as one piece (injection moulding or similar). They may however also be made of metal as a welded or cast assembly, or from another suitable material.

Structure or ribs 96 can be arranged on the inside of the concave body 94 facing the fingers 76; in the implementation shown, four ribs are arranged next to one another. The longitudinal extent of the ribs 96 can correspond to the rotational direction of the rotor 36, 38 and the longitudinal orientation of the fingers 76. The ribs 96 can comprise a leading edge 98 and a trailing edge 100. Starting from the body, in the rotational direction of the rotor 36, 38, the leading edge 98 can extend from a front end adjacent to the leading edge of the body 94, initially relatively flatly and then slightly more steeply towards the rear and the inside, up to a rounded end point 102 which adjoins the trailing edge 100. The trailing edge 100 can run towards the outside, starting from the end point 102, and then again towards the front (against the rotational direction of the rotor 36, 38). The ribs 96 can thus be shaped like a shark fin. The rib 96 can further include a trailing edge 100 extending from an end point 102 of the leading edge 98 in the direction towards the body 94 of the closing flap 66, and the trailing edge 100 of the rib 96 can enclose a trailing angle (θ) with the radius (r) (FIG. 7) of the separating cage 46.

An operating method of closing flaps 66 is evident from FIGS. 7 and 8. FIG. 7 shows a closing flap 66 in closed position. Passages 108 may remain between axially adjacent fingers 76 and between the tips of the respective fingers 76 and the following longitudinal strip 78 of the next finger 76 in the circumferential direction, through which passages the grain and other crop constituents can flow. A cavity 110 can remain between the passages 108 and the body 94 of the closing flap 66 since this has a certain distance from the fingers 76. Crop may collect there. The crop lies amongst others in the undercut region 112 of the ribs 96. If the closing flap 94 is now brought into the open position shown in FIG. 8, the rib 96 can carry at least some of the crop out of the cavity 110. The following crop then clears the crop out of the cavity 110, and the desired operation of the separating cage 46 can be carried out with the closing flap 66 open, without disruptive clogging.

Figure 9:
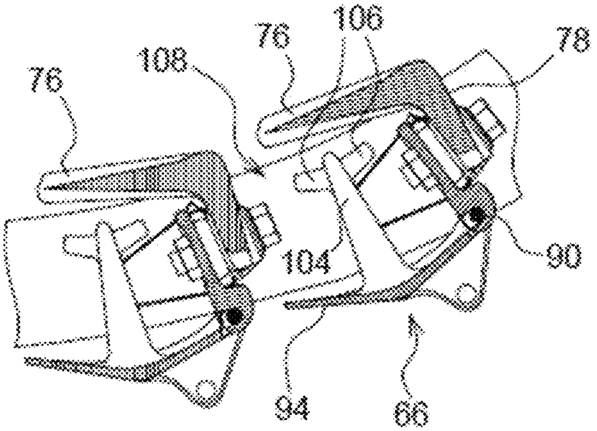
FIG. 9 shows a second implementation of a closing flap.

FIG. 9 shows a possible second implementation. Instead of (or in addition to) the ribs 96, inwardly protruding rods 104 can be arranged on the inside of the body 94 of the closing flap 66, with transverse branches 106 extending radially therefrom, and can be oriented in precisely the same way as the ribs of the first implementation, i.e. they extend in the circumferential direction of the rotors 36, 38. The operating method corresponds to that of the first implementation.

The closing flaps according to the disclosure may also be used on tangential threshers and tangential separating devices. They may also be assigned to the threshing portion 32. In the illustrated implementation, the threshing or separating elements, between which the passages 108 remain, are shown in the drawings as fingers 76 and longitudinal strips 78; instead of these, any other threshing or separating elements may be used (e.g. strips and wires or similar).

The relatively flat and streamlined design of the ribs 96 or rods 104 and transverse branches 106 generally avoids disruptive elements in the crop flow at which crop would collect, in particular when the closing flap 66 is opened.

While the above describes example implementations of the present disclosure, these descriptions should not be viewed in a limiting sense. Rather, other variations and modifications may be made without departing from the scope and spirit of the present disclosure as defined in the appended claims.

The invention claimed is:

1. A closer for a separating cage of a separating device, wherein the separating cage is provided with separating elements which are configured, in cooperation with a separating rotor of the separating device, to separate grain, and the separated grain can pass through passages provided between separating elements and reach a cleaning system, a cavity being defined downstream of said passages, said closer comprising:

a closing flap movable between a closed position, in which the closing flap at least partially closes the cavity, and an open position, said closing flap having a body and a side facing the cavity, the closing flap includes structure positioned, when the closing flap is in the closed position, to inwardly protrude from the side facing the cavity and into a portion of the cavity between the side facing the cavity and the passages to extract crop which has collected in the cavity as the closing flap moves from the closed to open position, the structure comprising at least one rib having a leading edge extending from the body and a trailing edge extending from an end point of the leading edge back toward the body, the at least one rib having an undercut region on a side of the trailing edge in which crop collects when the closing flap is in the closed position.

2. The closer as claimed in claim 1, wherein the body is pivotally movable between the open and closed positions.

3. The closer as claimed in claim 2, wherein the at least one rib extends from the body in the direction of the inner circumference of the separating cage and in the circumferential direction of the separating cage.

4. The closer as claimed in claim 3, wherein the leading edge extends, relative to a rotational direction of the separating rotor, from a leading end adjacent to a pivot axis in the rotational direction of the separating rotor, and gradually draws nearer to the inner circumference of the separating cage.

5. The closer as claimed in claim 4, wherein the trailing edge of the rib encloses a trailing angle with the radius of the separating cage.

6. A separating device comprising:

a separating rotor, a separating cage provided with separating elements which are configured, in cooperation with the separating rotor, to separate grain, and the separated grain can pass through passages provided between the separating elements and reach a cleaning system, and a closing flap movable between a closed position, in which the closing flap at least partially closes a cavity arranged downstream of one or more of the passages, and an open position, said closing flap having a body and further comprising structure positioned, when the closing flap is in the closed position, to inwardly protrude from a side of the closing flap facing the cavity and into a portion of the cavity between the side and the passages, to extract crop which has collected in the cavity as the closing flap moves from the closed to open position, the structure comprising at least one rib having a leading edge extending from the body and a trailing edge extending from an end point of the leading edge back toward the body, the at least one rib having an undercut region on a side of the trailing edge in which crop collects when the closing flap is in the closed position.

7. The separating device of claim 6, wherein the body is pivotally movable between the open and closed positions, and wherein the at least one rib extends from the body in the direction of the inner circumference of the separating cage and in the circumferential direction of the separating cage.

8. The separating device of claim 7, and further comprising inwardly protruding rods arranged on an inside of the body of the closing flap, with transverse branches extending from the rods.

9. The separating device as claimed in claim 8, wherein the leading edge extends, relative to a rotational direction of the separating rotor, from a leading end adjacent to a pivot axis in the rotational direction of the separating rotor, and gradually draws nearer to the inner circumference of the separating cage.

10. The separating device as claimed in claim 9, wherein the trailing edge of the rib encloses a trailing angle with the radius of the separating cage.

11. A closer for a threshing cage of a threshing device, wherein the threshing cage is provided with threshing elements which are configured, in cooperation with a threshing rotor of the threshing device, to thresh grain, and the threshed grain can pass through passages provided between threshing elements and reach a cleaning system, a cavity being defined downstream of said passages, said closer comprising:

a closing flap movable between a closed position, in which the closing flap at least partially closes the cavity, and an open position, said closing flap having a body and a side facing the cavity, the closing flap includes structure positioned, when the closing flap is in the closed position, to inwardly protrude from the side facing the cavity and into a portion of the cavity between the side facing the cavity and the passages to extract crop which has collected in the cavity as the closing flap moves from the closed to open position, the structure comprising at least one rib having a leading edge extending from the body and a trailing edge extending from an end point of the leading edge back toward the body, the at least one rib having an undercut region on a side of the trailing edge in which crop collects when the closing flap is in the closed position.

12. The closer as claimed in claim 11, wherein the body is pivotally movable between the open and closed positions.

13. The closer as claimed in claim 12, wherein the at least one rib extends from the body in the direction of the inner circumference of the threshing cage and in the circumferential direction of the threshing cage.

14. The closer as claimed in claim 11, wherein the leading edge extends, relative to a rotational direction of the threshing rotor, from a leading end adjacent to a pivot axis in the rotational direction of the threshing rotor, and gradually draws nearer to the inner circumference of the threshing cage.

15. The closer as claimed in claim 14, wherein the trailing edge of the rib encloses a trailing angle with the radius of the threshing cage.

* * * * *